(12) United States Patent
Hagerott et al.

(10) Patent No.: US 7,444,267 B2
(45) Date of Patent: Oct. 28, 2008

(54) SYSTEM AND METHOD TO SYNCHRONIZE AND COORDINATE PARALLEL, AUTOMATED FAULT INJECTION PROCESSES AGAINST STORAGE AREA NETWORK ARRAYS

(75) Inventors: Steven G. Hagerott, Wichita, KS (US); John Lara, Wichita, KS (US); Feng Chen, Bel Aire, KS (US); Christina Chao, Lafayette, CO (US)

(73) Assignee: LSI Corporation, Milpitas, CA (US)

( * ) Notice: Subject to any disclaimer, the term of this patent is extended or adjusted under 35 U.S.C. 154(b) by 377 days.

(21) Appl. No.: 11/248,544

(22) Filed: Oct. 12, 2005

(65) Prior Publication Data

US 2007/0088520 A1 Apr. 19, 2007

(51) Int. Cl.
*G06F 7/00* (2006.01)
(52) U.S. Cl. .......................... 702/186; 707/1
(58) Field of Classification Search ................. 702/186, 702/182–185, 188; 707/1–7
See application file for complete search history.

(56) References Cited

U.S. PATENT DOCUMENTS

2002/0077782 A1* 6/2002 Fruehling et al. ........... 702/185

* cited by examiner

*Primary Examiner*—Edward Raymond
(74) *Attorney, Agent, or Firm*—Suiter, Swantz PL LLO

(57) ABSTRACT

A system and method for synchronizing and coordinating parallel, automated fault injection processes against storage area network arrays. In an exemplary embodiment, the stress test system includes a hierarchical lock file acting as a repository for lock and state data of storage area network resources. Further, such embodiment includes a plurality of knowledge sources communicatively coupled to the hierarchical lock file for monitoring activities of the storage area network resources and injecting faults. In addition, the system includes a controller for controlling access to the hierarchical lock file and coordinating activities of the plurality of knowledge sources. The plurality of knowledge sources are individual stress action words which are utilized by the hierarchical lock file to coordinate multiple, parallel stress tests against storage area network components without requiring modifications to the underlying code to be made.

20 Claims, 12 Drawing Sheets

| INPUT PARAMETER | ALLOWABLE VALUES |
|---|---|
| 202 ARRAY ID | ARRAY_1, ETC.<br>DEFAULT = ARRAY_1<br>NOT AN INPUT PARAMETER FOR CYCLEHOSTIO. |
| 204 TEST | TRUE, FALSE<br>DEFAULT = FALSE<br>ONLY FALSE IS SUPPORTED FOR THIS PROTOTYPE. |
| 206 START TIME OFFSET | INTEGER IN MINUTES<br>DEFAULT = 0 |
| 208 SLEEP MINIMUM<br>(ALLOWS RANDOMLY VARYING SLEEP TIMES IN BETWEEN MINIMUM AND MAXIMUM, TO MEET NCR 3X FAULT REQUIREMENTS.) | INTEGER IN MINUTES<br>DEFAULT = 10 |
| 210 SLEEP MAXIMUM<br>(ALLOWS RANDOMLY VARYING SLEEP TIMES IN BETWEEN MINIMUM AND MAXIMUM, TO MEET NCR 3X FAULT REQUIREMENTS.) | INTEGER IN MINUTES<br>DEFAULT = 10 |

| INPUT PARAMETER | ALLOWABLE VALUES |
|---|---|
| MAX CYCLE TIME | INTEGER IN MINUTES. OPTIONAL PARAMETER. OVERRIDES SLEEP. |
| SYNCHRONIZATION PARENT | RESOURCE DOT NOTATION: ARRAY_X.CM_1.CTRL_X.ACTIONWORD OPTIONAL PARAMETER. MUST SPECIFY MAX CYCLE TIME WHEN USING THIS PARAMETER. |
| SYNCHRONIZATION TYPE | START_START (START & FINISH AND FINISH_TO_START MAY BE REQUIRED IN THE FUTURE. START_START IS SUFFICIENT FOR NOW.) OPTIONAL PARAMETER, REQUIRED WITH SYNCHRONIZING PARENT. MUST SPECIFY MAX CYCLE TIME WHEN USING THIS PARAMETER. |
| SYNCHRONIZATION LAG | INTEGER IN MINUTES. OPTIONAL PARAMETER, REQUIRED WITH SYNCHRONIZING PARENT. MUST SPECIFY MAX CYCLE TIME WHEN USING THIS PARAMETER. |

| ACTION WORD | INPUT PARAMETER | ALLOWABLE VALUES | FUNCTIONALITY |
|---|---|---|---|
| CYCLE SYS REBOOT CONTROLLER | LOCK WHILE SLEEPING | TRUE, FALSE [DEFAULT] | LOCKS CONTROLLER WHILE SLEEPING, EVEN THOUGH SOD HAS COMPLETED. |
| CYCLE SYS REBOOT CONTROLLER | MAX SOD TIME | INTEGER, MINUTES 10 [DEFAULT] | WILL THROW A TEST FAIL EXCEPTION IF THIS TIME IS EXCEEDING TO GO THROUGH SOD. |
| CYCLE CONTROLLER FAILOVER | MAX UNFAIL TIME | INTEGER, MINUTES 10 [DEFAULT] | WILL THROW A TEST FAIL EXCEPTION IF THIS TIME IS EXCEEDING TO UNFAIL A CONTROLLER. |
| CYCLE FIB_CONTROLLER, CYCLE FIB_ESM | HW AUTO DEVICE TYPE & HW AUTO COMMAND1, COMMAND2 | | ALLOWS ONE TO SET THE REQUIRED INPUT PARAMETERS FOR THE I2C MASTER. ALLOWS TWO COMMANDS TO BE CYCLED THROUGH, E.G., NOMINAL AND HARD RESETS. |
| CYCLE FIB_ESM | DM_X | THE DRIVE TRAY THE FIB PAIR IS ATTACHED TO. DM_1 [DEFAULT] | INDICATES WHICH ESM PAIR THE ACTION WORD SHOULD ACT ON. REQUIRES A FIB ATTACHED TO BOTH ESMS. |
| CYCLE DRIVE FAIL, CYCLE DRIVE FAIL DTAB | FAILURE PATTERN | ALL FAIL ALL UNFAIL [DEFAULT], SINGLE FAIL UNFAIL | CONTROLS THE ORDERING OF THE FAIL / UNFAIL CYCLES THROUGH DRIVE LIST. |

FIG. 3A

| FIG. 3A |
|---|
| FIG. 3B |

FIG. 3

| ACTION WORD | INPUT PARAMETER | ALLOWABLE VALUES | FUNCTIONALITY |
|---|---|---|---|
| CYCLE DRIVE FAIL, CYCLE DRIVE FAIL DTAB | MAX RECONSTRUCT TIME | INTEGER, MINUTES 1000 MINUTES | WILL THROUGH A TEST FAIL EXCEPTION IF THIS TIME IS EXCEEDED FOR A VOLUME TO RECONSTRUCT. |
| CYCLE ARRAY POWER | LOCK BOTH CONTROLLERS | TRUE [DEFAULT], FALSE | CONTROLS HOW MANY CONTROLLERS PER ARRAY ARE REQUIRED BEFORE POWER CYCLING THE ARRAY. |
| CYCLE DVE, CYCLE DCE | | | NEED FURTHER INFO ON POSSIBLE DVE, DCE INPUT PARAMETERS. |
| CYCLE HOSTIO | HOSTID | HOST_1 [DEFAULT], ETC. | SPECIFIES WHICH HOST TO PERFORM IO CYCLING ON. |
| CYCLE HOSTIO | IO_LUNS | ALL [DEFAULT], OTHER OPTIONS? | NEED FURTHER INFO ON POSSIBLE HOST IO MONITORING. |

FIG. 3B

| FIG. 3A |
|---|
| FIG. 3B |

FIG. 3

| ACTION WORD | ARBITRATED LOCKS & STATES AFFECTED |
|---|---|
| CYCLE SYS REBOOT | ARRAY_X.CM_1.CTLR_1, ARRAY_X.CM_1.CTLR_2 |
| CYCLE CONTROLLER FAILOVER | ARRAY_X.CM_1.CTLR_1, ARRAY_X.CM_1.CTLR_2 |
| CYCLE DRIVE FAIL | DRIVE_X.VOLUME GROUP_X |
| CYCLE DRIVE FAIL DTAB | DRIVE_X.VOLUME GROUP_X |
| CYCLE ARRAY POWER | ARRAY_X.CM_1.CTLR_1, ARRAY_X.CM_1.CTLR_2 (THIS MAY HAVE TO "TRUMP" THE LOCKS ON ALL AFFECTED POWER SUPPLIES, DRIVES, VOLUME GROUPS, AND ESMS.) |
| CYCLE DVE, CYCLE DCE | NO LOCKS. SET VOLUME_X STATE TO DYNAMIC OP. |
| CYCLE HOST IO | NO LOCKS. SET VOLUME_X STATE TO IO_ACTIVE. |
| CYCLE FIB_CONTROLLER | ARRAY_X.CM_1.CTLR_1, ARRAY_X.CM_1.CTLR_2 |
| CYCLE FIB_ESM | ARRAY_X.DM_X.ESM_1, ARRAY_X.DM_X.ESM_2 |

FIG. 4

| ACTION WORD | SLEEP DEFINITION | MAX CYCLE TIME DEFINITION |
|---|---|---|
| CYCLE SYS REBOOT | THE TIME BETWEEN THE CONFIRMING SOD MAIN COMPLETE ON A CONTROLLER AND THE ISSUING OF A SYS REBOOT COMMAND ON THE ALTERNATE CONTROLLER. | THE TOTAL TIME BETWEEN ISSUING SYS REBOOT ON ONE CONTROLLER AND THE ISSUING OF SYS REBOOT ON THE ALTERNATE CONTROLLER. |
| CYCLE CONTROLLER FAILOVER | THE TIME BETWEEN THE CONFIRMATION THAT A CONTROLLER IS FAILED AND ISSUING OF THE UNFAIL COMMAND ON THE SAME CONTROLLER.<br><br>ALSO,<br><br>THE TIME BETWEEN THE CONFIRMATION THAT A CONTROLLER IS UNFAILED AND ISSUING OF THE FAIL COMMAND ON THE SAME CONTROLLER. | THE TOTAL TIME BETWEEN ISSUING THE FAIL COMMAND ON ONE CONTROLLER AND THE ISSUING OF THE UNFAIL COMMAND ON THE SAME CONTROLLER.<br><br>ALSO,<br><br>THE TOTAL TIME BETWEEN ISSUING THE UNFAIL COMMAND ON ONE CONTROLLER AND THE ISSUING OF THE FAIL COMMAND ON THE SAME CONTROLLER. |
| CYCLE DRIVE FAIL | THE TIME BETWEEN THE CONFIRMATION THAT A PARTICULAR DRIVE IS FAILED / UNFAILED AND THE ISSUING OF A FAIL / UNFAIL COMMAND ON ANOTHER DRIVE OR THE SAME DRIVE (DEPENDS ON THE FAILURE SEQUENCE SELECTED). | THE TOTAL TIME BETWEEN ISSUING OF A FAILED/UNFAIL COMMAND ON A PARTICULAR DRIVE AND THE ISSUING OF A FAIL / UNFAIL COMMAND ON ANOTHER DRIVE OR THE SAME DRIVE (DEPENDS ON THE FAILURE SEQUENCE SELECTED). |
| CYCLE DRIVE FAIL DTAB | SAME AS CYCLE DRIVE FAIL | SAME AS CYCLE DRIVE FAIL |

FIG. 5A

| ACTION WORD | SLEEP DEFINITION | MAX CYCLE TIME DEFINITION |
|---|---|---|
| CYCLE ARRAY POWER | THE TIME BETWEEN THE CONFIRMATION THAT AN ARRAY IS POWERED OFF AND ISSUING OF THE POWER ON COMMAND TO THE SAME ARRAY.<br><br>ALSO,<br><br>THE TIME BETWEEN THE CONFIRMATION THAT AN ARRAY IS POWERED ON AND ISSUING OF THE POWER OFF COMMAND TO THE SAME ARRAY. | THE TOTAL TIME BETWEEN ISSUING THE POWER OFF COMMAND TO AN ARRAY AND THE ISSUING OF THE POWER ON COMMAND TO THE SAME ARRAY.<br><br>ALSO,<br><br>THE TOTAL TIME BETWEEN ISSUING THE POWER ON COMMAND TO AN ARRAY AND THE ISSUING OF THE POWER OFF COMMAND TO THE SAME ARRAY. |
| CYCLE DVE, CYCLE DCE | LIKELY THE TIME BETWEEN CONFIRMING A DVE/DCE OPERATION HAS BEGUN AND THE ISSUING OF THE NEXT DVE/DCE OPERATION. | THE TOTAL TIME BETWEEN ISSUING A DVE/DCE OPERATION AND THE ISSUING OF THE NEXT DVE/DCE OPERATION. |
| CYCLE HOSTIO | THE TIME BETWEEN QUERYING OF THE HOST'S IO STATE AND THE RECONFIRMATION OF A HOST'S IO STATE. | THE TOTAL TIME BETWEEN CHECKING A HOST'S IO STATE AND THEN RECHECKING A HOST'S IO STATE. |
| CYCLE FIB_CONTROLLER, CYCLE FIB_ESM | THE TIME BETWEEN THE CONFIRMATION THAT HW AUTO/COMMAND1 WAS ISSUED AND ISSUING OF THE HW AUTO/COMMAND2 TO THE SAME FIB.<br><br>ALSO,<br><br>THE TIME BETWEEN THE CONFIRMATION THAT HW AUTO/COMMAND2 WAS ISSUED AND ISSUING OF THE HW AUTO/COMMAND1 TO THE SAME FIB. | THE TOTAL TIME BETWEEN ISSUING THE HW AUTO/COMMAND1 AND THE ISSUING OF HW AUTO/COMMAND2 TO THE SAME FIB.<br><br>ALSO,<br><br>THE TOTAL TIME BETWEEN ISSUING THE HW AUTO/COMMAND2 AND THE ISSUING OF HW AUTO/COMMAND1 TO THE SAME FIB. |

| FIG. 5A |
|---|
| FIG. 5B |

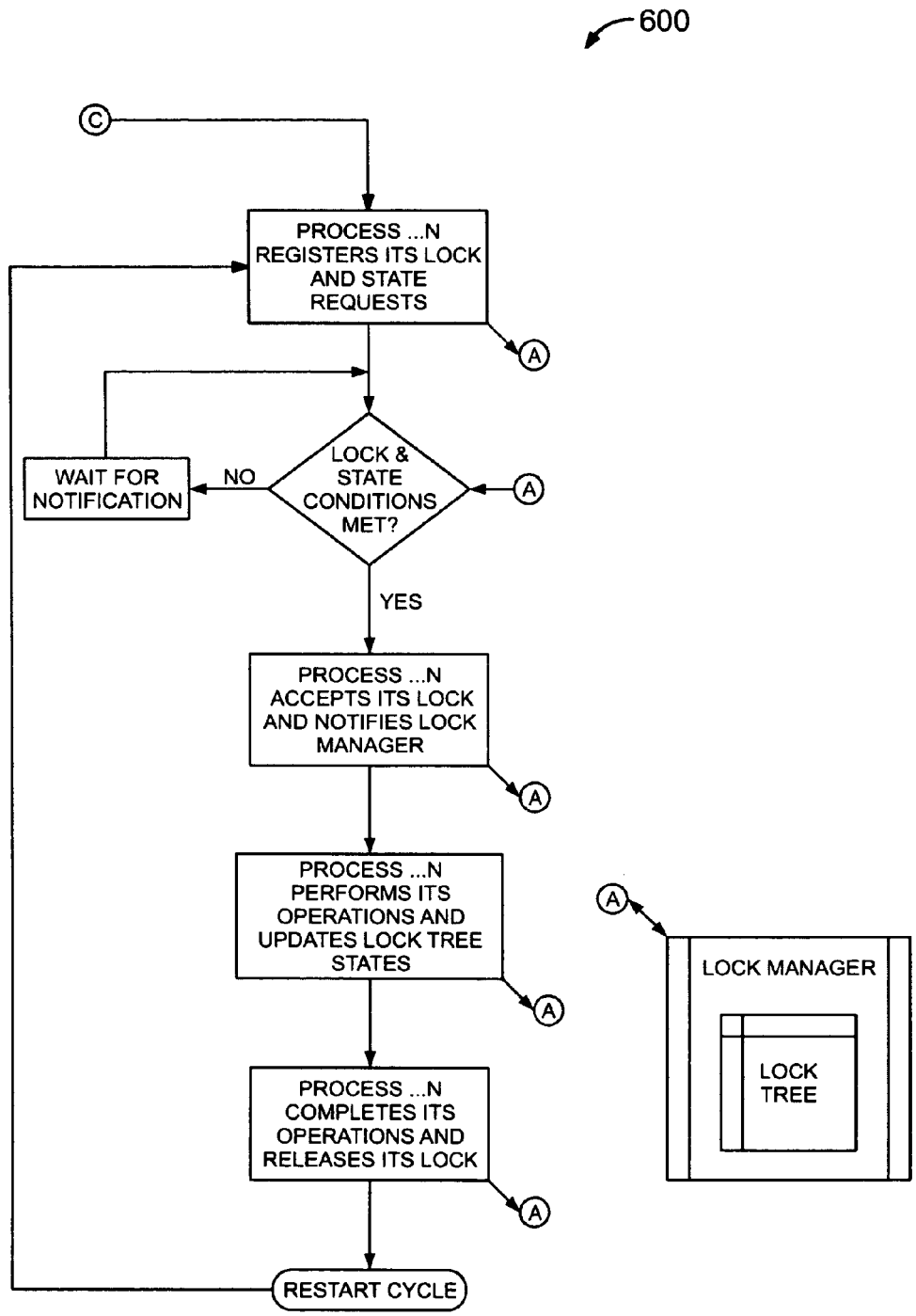

US 7,444,267 B2

SYSTEM AND METHOD TO SYNCHRONIZE AND COORDINATE PARALLEL, AUTOMATED FAULT INJECTION PROCESSES AGAINST STORAGE AREA NETWORK ARRAYS

FIELD OF THE INVENTION

The present invention relates to the field of computer systems and information storage and more particularly, to a system and method for synchronizing and coordinating parallel, automated fault injection processes against storage array networks.

BACKGROUND OF THE INVENTION

In recent years, the amount of information which an enterprise needs to be able to process and store has increased dramatically. Some possible reasons for such increase are the ever-increasing reliance by enterprises on the Internet to transact business, the desire to be able to access information from multi-locations by using varying devices (e.g., a cell phone, personal digital assistant, and laptop computer), and the need to meet compliance requirements which encourage enterprises to preserve all information/transactions. Traditionally, enterprises managed information storage by directly linking servers to a local storage subsystem. This direct server-attached storage system, however, is disadvantageous for such system creates a number of "storage islands" at possibly multiple locations which increases management complexity, limits scalability, and results in performance bottlenecks in the server and the local area network. Due to the limitations associated with a direct server-attached storage system, enterprises are currently replacing such system with a Storage Area Network (SAN) which allows storage management to be centralized.

In order to determine the functional limitations of a SAN, the SAN is subjected to stress testing which determines the functional limitations of the network by subjecting the system to extreme conditions such as peak volumes of data. Currently, stress testing against SAN is performed using customized test programs. The customized test programs require complex code modifications in order to create new combinations of stress test types (e.g., controller failover, system reboot, drive failure, hardware fault injection, and the like).

The required code modifications for the new combinations of stress test types is caused by the challenge in synchronizing multiple, parallel stress tests against a limited array of resources such as controllers, volume groups, drives, and the like. These fault injection processes may be coordinated within a given array and sometimes synchronized across multiple arrays in a SAN to meet automated test requirements. Thus, the use of customized test programs requires excessive test and development time for a program must be designed to handle each combination of parallel fault injections. Further, such programs are high maintenance in that new code is required to satisfy each new timing requirement. In addition, the coding of these test combinations is complicated by the coordination of multiple fault injection processes attempting to access a given SAN resource (e.g., drives, controllers, volume groups, and the like) at the same time.

Therefore, it would be desirable to provide a system and method for synchronizing and coordinating parallel, automated fault injection processes against SANs which addressed the limitations associated with the aforementioned customized test programs.

SUMMARY OF THE INVENTION

Accordingly, the present invention is directed to a system and a method for synchronizing and coordinating parallel, automated fault injection processes against SAN arrays. In an aspect of the present invention, the system includes a hierarchical lock file acting as a repository for lock and state data of storage area network resources. Further, such system includes a plurality of knowledge sources communicatively coupled to the hierarchical lock file for monitoring activities of the storage area network resources and injecting faults. In addition, the system includes a controller for controlling access to the hierarchical lock file and coordinating activities of the plurality of knowledge sources. The plurality of knowledge sources are individual stress action words which are utilized by the hierarchical lock file to coordinate multiple, parallel stress tests against storage area network components without requiring modifications to the underlying code to be made.

In a further aspect of the present invention, the method for synchronizing and coordinating parallel, automated fault injection processes against SAN arrays is provided. The method includes creating a hierarchical lock file which is a repository for lock and state data of storage area network resources. Further, a plurality of stress action words which are utilized by the hierarchical lock file to coordinate multiple, parallel stress tests against storage area network components without requiring modifications to the underlying code are generated. In addition, the method includes communicatively coupling the plurality of stress action words to the hierarchical lock file via a controller for monitoring activities of the storage area network resources and injecting faults. In an exemplary aspect, such method is accomplished via employing a computer-readable medium having computer-executable instructions for performing such method.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 2 is a tabular illustration of examples of input parameters and allowable values for common stress action words in accordance with an exemplary embodiment of the present invention;

FIG. 3 is an additional tabular illustration of input parameters, allowable values, and functionality of stress action words in accordance with an exemplary embodiment of the present invention, wherein the stress action words all start with the word "cycle;"

FIG. 4 is a tabular illustration of stress action word hierarchical lock file usage;

FIG. 5 is a further table clarifying the process by which exemplary scenarios for floating timing using exemplary sleep input parameters and fixed timing using a MaxCycleTime input parameter may work with exemplary action words, wherein the sleep and MaxCycleTime input parameters are exclusive per action word;

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

Referring in general to FIGS. 1 through 7, a stress test system and method for stress testing storage area network (SAN) arrays are provided. In the present disclosure, all of the new combinations of stress test types and timing are controlled through script modifications and not modifications to the underlying code. For instance, new combinations of fault injections may be controlled through a script that calls the separate parallel processes, without requiring new code to be developed that coordinates the new combination. In an embodiment, individual stress action words are employed by the stress test system. Such words include sufficient knowledge about their effect on the storage array as well as of their requirements of the storage array state to allow them to automatically coexist and retime their operations to meet desired system functionality. Further, parallel processes are automatically coordinated through a lock manager and a single, generic semaphore structure (e.g., a hierarchical lock file). The complete state (eg., the state of each resource in the SAN and a queue of processes desiring to operate on each resource) of the SAN may be captured in the lock file. Such configuration allows an automated test to flag when a resource should be responding, but is not. In the present invention, new fault injection processes do not affect legacy fault injection processes due to the automatic coordination of new and old code by the hierarchical lock file. In addition, the present system includes a built in test mechanism where the system level timing of all of the parallel fault injection processes may be simulated. For example, the impact and delays caused by the SANs under test may be emulated through randomly varying sleep time allowing the automated test to be verified before it is actually run.

Figure 1:
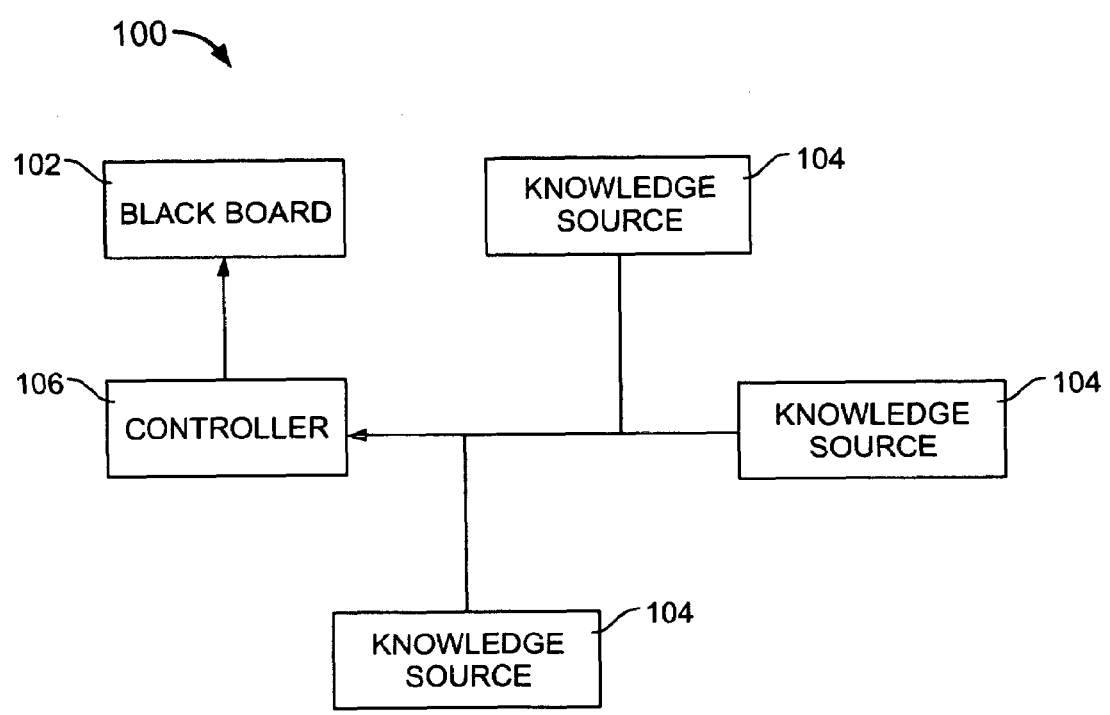
FIG. 1 is a block diagram illustrating a stress test system in accordance with an exemplary embodiment of the present invention, wherein the system includes a blackboard, a plurality of knowledge sources, and a controller.

Referring to FIG. 1, a stress test system 100 for stress testing SANs in accordance with an exemplary embodiment of the present invention is provided in which the system is based upon a blackboard architectural pattern based approach. In the exemplary embodiment, the stress test system 100 includes a blackboard 102. The blackboard 102 acts as a common data and state repository. Further, a plurality of knowledge sources 104 are communicatively coupled with the blackboard 102. Such sources 104 may be independent agents which act upon the blackboard 102, reading and writing, to solve a problem. In addition, a controller 106 is present within the stress test system 100 for controlling access to the blackboard 102 and coordinating the activities of multiple knowledge sources 104.

In an exemplary embodiment, the blackboard 102 may be a hierarchical lock file. In such embodiment, the hierarchical lock file captures the relationship between the various SAN components and stores a lock queue and state for each such component. For example, the hierarchical lock file may be an equipment lock tree which holds the lock and state data for all pertinent equipment components, physical and logical, in the SAN that will require arbitration for stress tests including, but not limited to, arrays, controllers, ESMs, drives, volume groups, volumes and the like. In further exemplary embodiments, the hierarchical lock file may include data access methods to decouple the controller and knowledge sources (e.g., stress action words) from possible data structure changes and additions within this group.

It is contemplated that the access methods and detailed structure of the lock file may be developed as desired by the developer. For example, an exemplary lock file may include drive trays and volume groups held in separate branches. In such example, the organization of the data, the relationship between arrays, controllers, drive trays, drives, hardware automation addresses, volume groups, and volumes is extractable. Such requirement allows the coordination of parallel action words that affect controllers, drive trays, ESMs, drives volume groups, and volumes such as system reboots, controller failovers, drive failures, DTAB drive failures, power cycling, hardware fault injection, dynamic volume expansion operations, input/output (I/O) operations and the like. Further, the exemplary lock file/tree includes a lock queue so that multiple, parallel action words may arbitrate for a resource. The initial order of action words in the queue may be determined by the order in which the competing action words appear in the action word script parallel block. In addition, state information is included in the exemplary lock file/tree so that action words that need a resource, but do not lock it, may know which resource to contact (e.g., a drive failure action word that needs to submit a symbol command to a controller, but does not need to lock a controller like a controller failover action word might). State information may also be required to coordinate multiple drive failure action words so that a given volume group, once degraded by a failed drive, is not completely failed by an action word failing a second drive in the volume group. The aforementioned exemplary lock file/tree includes one array. However, it is contemplated that any number of arrays may be included. For instance, a multi-array equipment lock file/tree may be employed to accomplish array to array synchronization of controller failover events. It is further contemplated that the initialization of all the locks and states of the lock file/tree may be performed on an as-needed/as-requested basis to make the algorithm more computationally efficient. For example, the tree may be automatically initialized by information contained within an equipment ID file. In such example, the drive, hot spares, volume group, volume information, and the like may be extracted from the array through symbol commands. In further examples, command line override parameters may be employed as well as long each action word in the parallel block receives all of the equipment relationship information it requires from these command line override parameters.

As further illustrated in FIG. 1, the plurality of knowledge sources 104 may be individual stress action words which are, in parallel, monitoring the SAN and injecting faults. It is to be understood that each stress action word may automatically work in conjunction with other action words within an action word script parallel block. Further, each stress action word is atomic so that the addition of new stress action words does not require changes to legacy stress action words. In addition, each action word may know which storage resources it effects and which storage resource states it requires, when.

In an exemplary embodiment, the stress test programs are decomposed into separate action words each of which start with the word "cycle" in their name. In such embodiment, each action word performs the function of cycling through the desired stress operation. For instance, a script author is not required to perform looping operations in the script for repeated, long running stress operations. In present embodiment, each stress action word may automatically work in conjunction with other action words within an action word script parallel block. "Work in conjunction with" may be defined by the following attributes: automatic synchronization of stress fault injections despite multiple action words requiring the same storage resource (e.g., controller, volume group, drive, volume, and the like); stress action words not supporting synchronization of two words within a parallel block that include the same name and operate on the same resource; synchronization timing across action words being controllable through action word input parameters; new action word combinations being supported through script and input parameter changes only, no changes to stress action words shall be required to support new scenarios; action input defaults supporting a default parallel action word timing scenario which results in a cascade of fault injections for action words which require competing SAN resources; action words with non-competing resources being executed in parallel to any cascaded action words (e.g., the order of the cascading may follow the order of the action words in the script parallel block); synchronization supporting a fault injection query per array resource so that resource requests from competing, parallel action words will be handled in turn; no single action word being capable of occupying a resource for the entire duration, instead each competing action word in a parallel block may have access to an array resource, in turn; and if an action word inputs within a parallel block require conflicting synchronization requirements, the issuing of a test fail exception.

In an embodiment, detection of a test failure exception within any action word in a parallel block may cause all operations to be stopped almost immediately (e.g., within a five second time interval). In further exemplary embodiments, the stress test system is capable detecting when a lock manager (controller/ESM) should be responding, but does not.

With continued reference to FIG. 1, in an exemplary embodiment, the controller 106 is a lock manager which synchronizes all reads and writes to the hierarchical lock file (e.g., equipment lock tree) from the parallel action word threads. The synchronization process is necessary for a given action word may update multiple locks and states throughout a lock file/tree, depending upon the action word's operation. Since each action word only needs to know its' required locks and states, the addition of new action words that affect the same locks or states will be arbitrated through the lock manager automatically. Such configuration is advantageous for the new action words do not require code changes to old action words.

It is to be understood that the lock manager may employ a number of methods to coordinate action words. In an embodiment, action words maintain their own lock and state combination requirements, and poll the hierarchical lock file/tree corresponding nodes through the lock manager until the combination requirements are met. For example, after receiving a lock for a desired resource, with other required resource state conditions met, the action word begins processing its' cycle loop. Each action word acting on a resource such as a lock manager/controller is responsible for updating that resource's state based upon the array condition querying that the action word performs. Such method allows one action word to properly communicate a given resource's state to all other interested action words. In an additional embodiment, action words may register their lock and state combination requirements with the lock manager and wait on the lock manager. In such embodiment, the lock manager notifies the appropriate action word when its lock and state requirements are met. Such method may be accomplished by utilizing Java based wait and notify methods used for multithreading, employing a publish subscribe describe pattern, or other like methods known in art.

In an exemplary embodiment, input parameters for action words including range of functionality and resource cycling (e.g., random, sequential, synchronized across arrays, and the like) are defined. Clarification of the input parameters and their effect on exemplary stress action words are itemized in FIGS. 2 through 5. For example, FIG. 5 clarifies the process by which exemplary scenarios for floating timing using exemplary sleep input parameters and fixed timing using a MaxCycleTime input parameter may work with exemplary action words. In such exemplary embodiment, the sleep and MaxCycleTime input parameters are exclusive per action word. For instance, one may only use sleep or MaxCycleTime, not both. In addition, although the allowable values presented in FIG. 2 define the integer in minutes, it is contemplated that such values may also be defined in seconds.

Referring to FIG. 2, examples of input parameters and allowable values for common stress action words are provided. In such embodiment, each input parameter is associated with at least one function. The input parameter ArrayID 202 may specify which array the action word may act upon. For instance, two of the same action words may not be allowed to operate on the same array in one script. The input parameter Test 204 may simulate a stress test by skipping array fault injections. Further, the input parameter StartTime Offset 206 may delay the start of action word cycling allowing for variable timing scenarios to be directly controlled. In an embodiment, such action word does not request the hierarchical lock file until this StartTimeOffset 206 has passed. In addition, the input parameters SleepMinimum 208 and SleepMaximum 210 may denote the minimum or the maximum time period to wait in between action word fault injections, respectively. Alternatively, such values may indicate the time to hold a fault injection. It is to be understood that such parameters support a floating cycle time requirement.

In the present embodiment, the input parameter MaxCycleTime 212 is considered to be optional unless employing the optional synchronized parameters. For example, the MaxCycleTime 212 and SynchronizingParent parameters are required for a test scenario including a controller failover with array to array synchronization. By using the MaxCycleTime 212, only the beginning of the fail/unfail cycles need to be coordinated. In the absence of the MaxCycleTime 212 parameter, a given action word may be required to poll all of the other action word's states to determine if they have completed their fail/sleep cycles. When used, the MaxCycleTime 212 parameter indicates the maximum time between complete action word cycles for a given resource and supports a fixed cycle time requirement. For instance, if the array event time exceeds this, a test fail exception is to be generated. Such configuration allows the entire cycle of events across arrays to remain synchronized even though only the initiating events (e.g., fail controller commands) are synchronized.

In an exemplary embodiment, in addition to the MaxCycleTime 212 parameter, synchronization parameters are also optional. First, a SynchronizationParent 214 parameter allows generic chaining and synchronization of events between two action words acting on noncompeting resources. Such parameter is capable of handling a deadlock condition that arises for the first cycle of events where the first action word in a parallel block has a lower action word in the block. Further, for action words that operate on dual resources (controllers and ESMs) the SynchronizingParent 214 may set the condition for Ctrl__1 or ESM__1. Following the standard flow of each action word, the events for Ctrl__2 will directly follow that of Ctrl__1 and those for ESM__2 from ESM__1. In addition, the input parameter SynchronizationType 216 allows the synchronization relationship to be defined between an action word and its parent. The SynchronizationLag 218 parameter indicates the time in minutes for a child action word to wait after a resource action word lock condition is met. The lock manager/controller may need to notify the child synchronized action words when the desired state is met or the child action word will have to poll the hierarchical lock file/tree through the lock manager/controller. The respective synchronization input parameters add to the state conditions of the action word that must be met before the action word starts it cycle. Further, to synchronize events to occur at the same time, all action words may need to set the first action word in the parallel block as its parent. Such first action word may then set the last action word in the parallel block as its parent. In an alternative embodiment, the SynchronizationLag 218 may be set to zero.

Figure 6A:
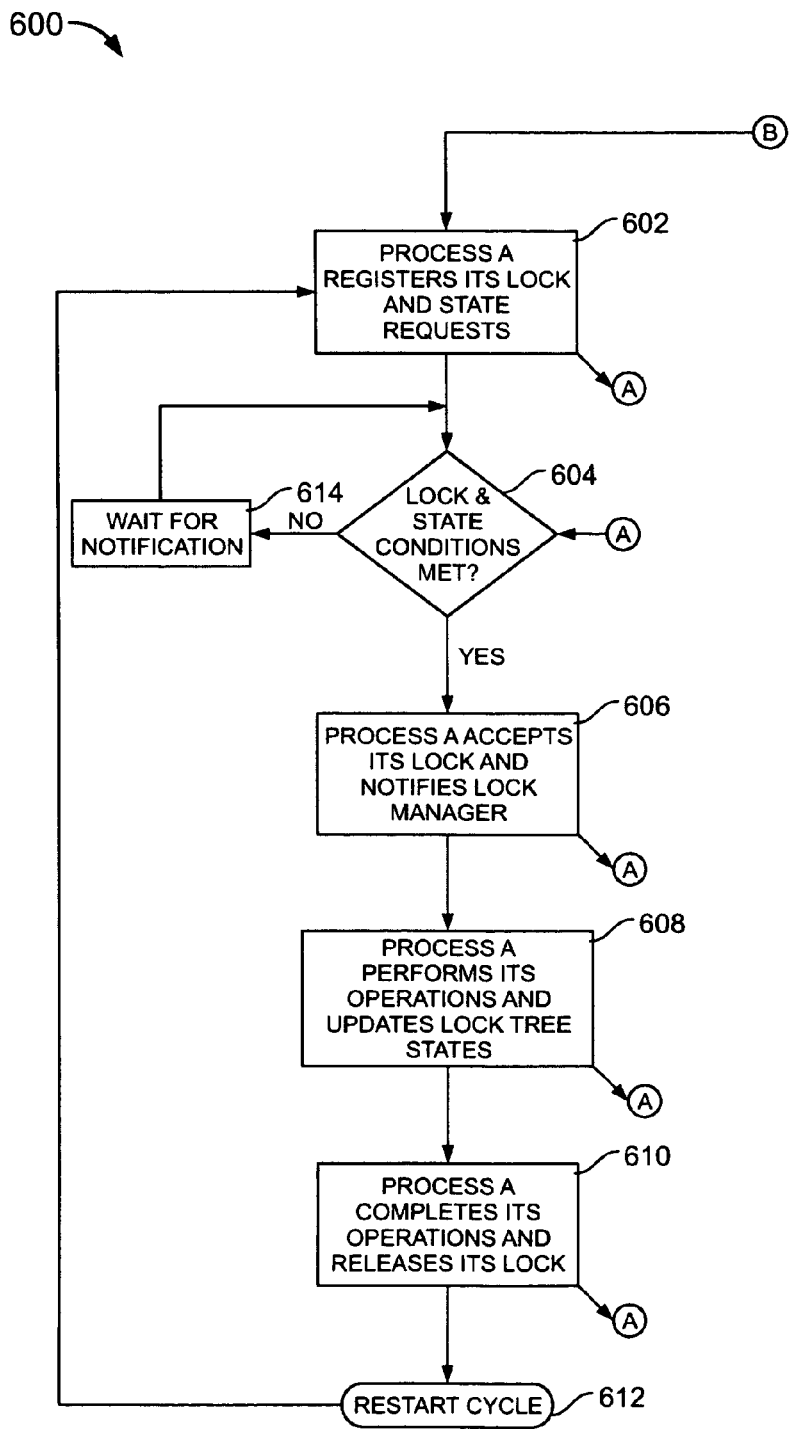
FIG. 6 is a flow diagram in accordance with an exemplary embodiment of the present invention, wherein the flow diagram illustrates the coordination of multiple, simultaneous processes through a hierarchical lock file.
Figure 6B:
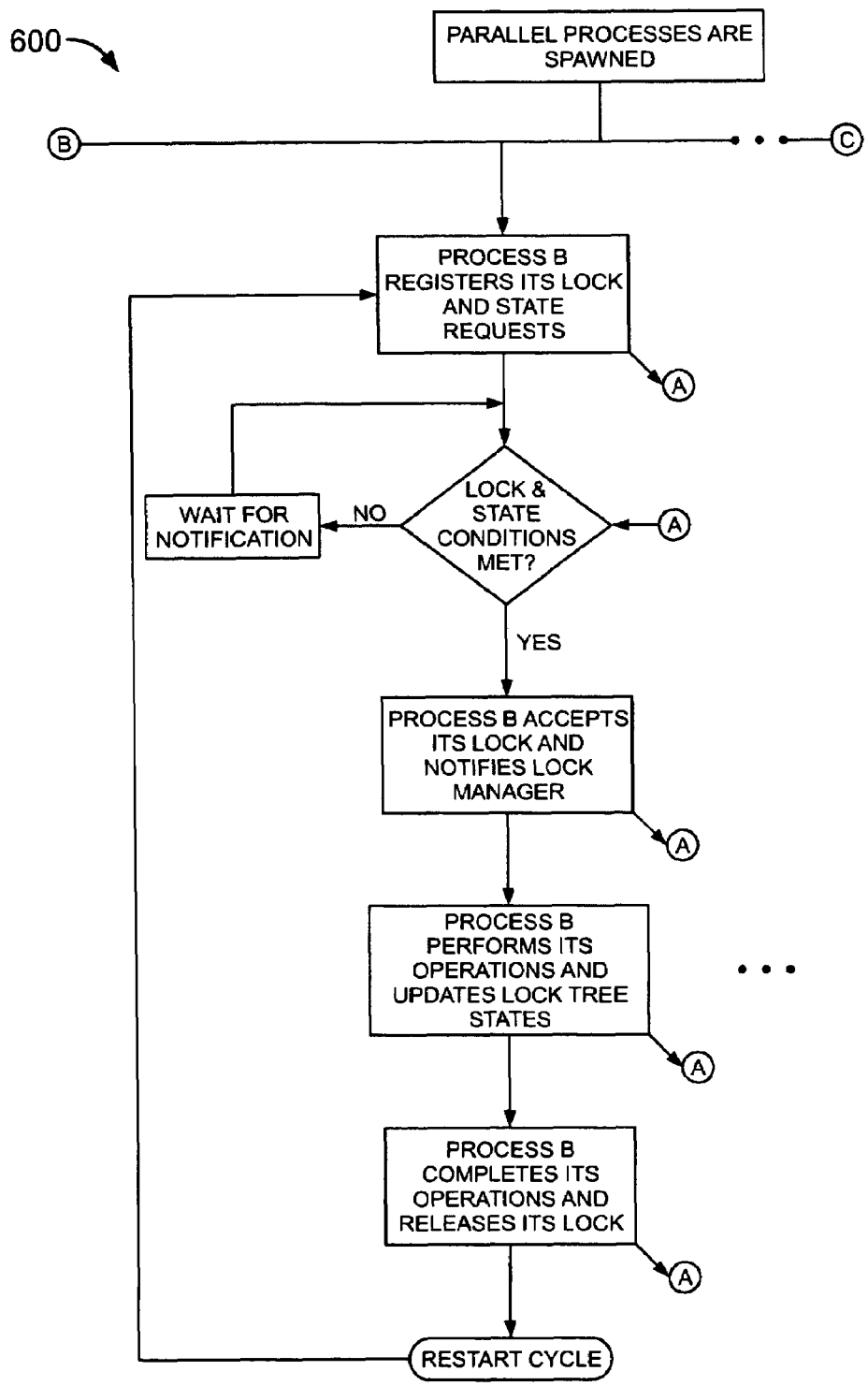
Figure 6:
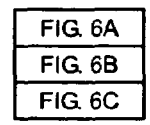

Referring now to FIG. 6, the coordination of multiple, simultaneous processes through a hierarchical lock file is provided. In an exemplary embodiment, simultaneous processes may be initiated through a simplified scripting layer or other similar mechanisms. In such embodiment, the hierarchical lock file holds the logical relationships between all resources in a SAN including, but not limited to, controllers, ESMs, power supplies, drives, volumes, volume groups, and the like. In the present embodiment, each action word coordinates its activities through the hierarchical lock file/lock tree. Further, each action word may include a set of equipment locks it will require and/or states of other pieces of equipment which must be satisfied before an available lock from the tree is accepted by the action word. By coordinating through equipment locks and states, a number of coordinating combinations may be supported simultaneously. For example, a system reboot controller action word may properly coordinate controller locks and states with a simultaneous controller failover action word. Further, multiple drive failure action words may automatically coordinate their impact on drives and volume groups, even if the drive failure action words use software or hardware failure injection.

As illustrated in FIG. 6, multiple parallel processes including Process A, Process B, up to Process n may be spawned simultaneously. For example, Process A begins by registering its lock and state requests with the hierarchical lock file 602. If the lock and state conditions are met 604, Process A accepts its lock and notifies the lock manager of such action 606. Process A then proceeds to perform its operations and update the hierarchical file/lock tree states 608. Process A completes its operations and releases its lock 610. The cycle is then restarted 612. If lock and state conditions are not met, such process may enter a wait mode 614 until receiving notification that such conditions have been satisfied. Process B and up to Process n may proceed in parallel through similar pathways as Process A.

Figure 7:
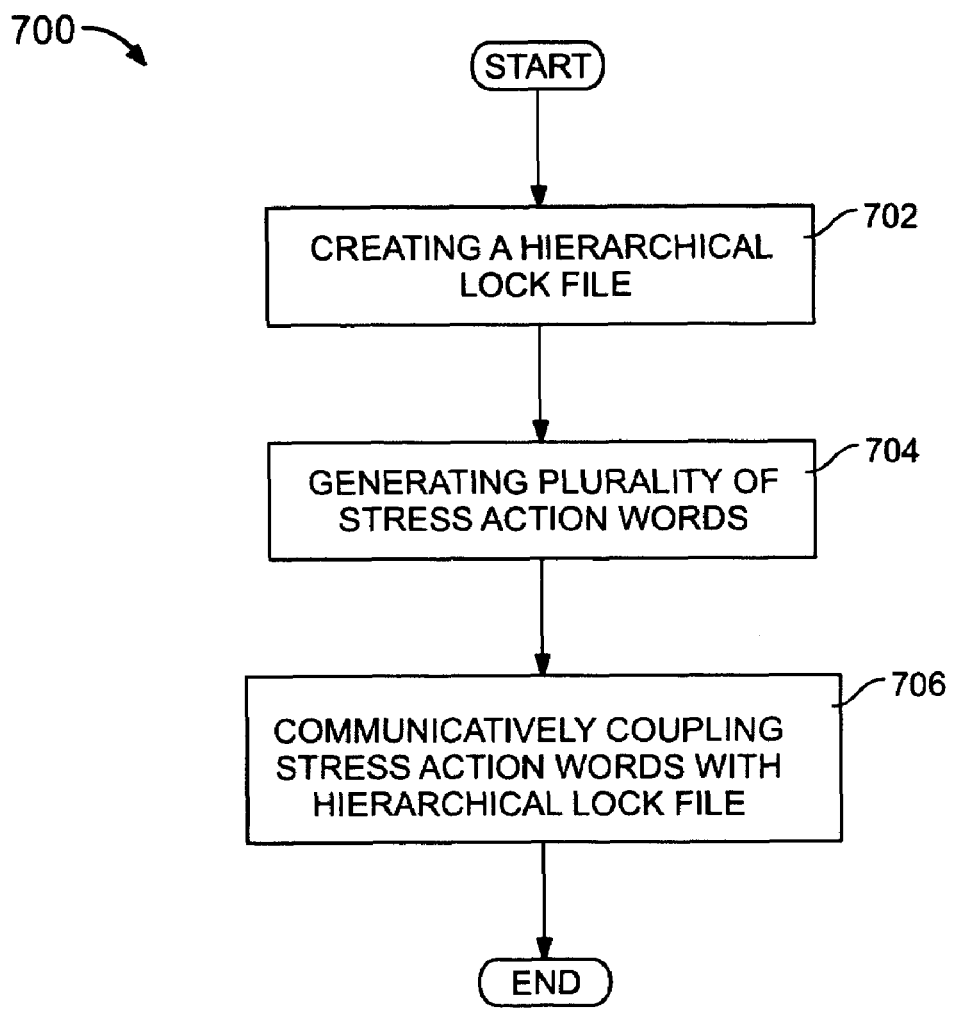
FIG. 7 is a flow diagram of a method for synchronizing and coordinating parallel, automated fault injection processes against storage area network arrays in accordance with an exemplary embodiment of the present invention.

Referring to FIG. 7, a method 700 for synchronizing and coordinating parallel, automated fault injection processes against storage area network arrays in accordance with an exemplary embodiment of the present invention is provided. The method 700 includes creating a hierarchical lock file 702. An exemplary hierarchical lock file acts as a repository for lock and state data of storage area network resources. Further, in an embodiment, the hierarchical lock file includes a lock queue allowing multiple, parallel action words to arbitrate for a resource. For example, the hierarchical lock file is an equipment lock tree which maintains lock and state data for storage network area components which require arbitration for stress tests. In addition, the hierarchical lock file may also include data access methods to decouple the controller and plurality of knowledge sources.

As illustrated in FIG. 7, the method 700 includes generating a plurality of stress action words 704 which are utilized by the hierarchical lock file to coordinate multiple, parallel stress tests against storage area network components without requiring modifications to the underlying code. In an embodiment, the stress action words are atomic so that the addition of new stress action words does not require changes to previous existing stress action words. Further, the stress action words may maintain their own lock and state requirements. In the present embodiment, each stress action word begins with the word "cycle" in which each action word performs the function of cycling through a chosen stress test operation.

With continued reference to FIG. 7, the method 700 includes communicatively coupling the plurality of stress action words to the hierarchical lock file 706. In an exemplary embodiment the plurality of stress words are communicatively coupled to the hierarchical lock file via a controller. For example, the controller is a lock manager which synchronizes all reads and writes to the hierarchical lock file from parallel stress action words. Such configuration allows the controller to monitor the activities of the storage area network resources as well as inject faults into such resources.

The present disclosure presents a stress test system and method designed around an object oriented implementation using Java or C code. It is contemplated that procedural, non-object oriented software may also be employed as long as the blackboard (e.g., hierarchical lock file) is accessed and controlled by a single controller (e.g., lock manager). For example, such approach may be used to automatically coordinate any set of parallel processes that operate on competing resources. It is further contemplated that the disclosed hierarchical lock file may be implemented via various known data structures including a tree, dynamic arrays, tabulation of strings with a naming convention, and the like.

It is to be noted that the foregoing described embodiments according to the present invention may be conveniently implemented using conventional general purpose digital computers programmed according to the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is to be understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for stress testing storage area networks, comprising:
   a hierarchical lock file being a repository for lock and state data of storage area network resources;
   a plurality of knowledge sources communicatively coupled to the hierarchical lock file for monitoring activities of the storage area network resources and injecting faults; and
   a controller for controlling access to the hierarchical lock file and coordinating activities of the plurality of knowledge sources,
   wherein the plurality of knowledge sources are individual stress action words which are utilized by the hierarchical lock file to coordinate multiple, parallel stress tests against storage area network components without requiring modifications to the underlying code.

2. The system as claimed in claim 1, wherein the hierarchical lock file includes a lock queue allowing multiple, parallel action words to arbitrate for a resource.

3. The system as claimed in claim 1, wherein the hierarchical lock file includes data access methods to decouple the controller and plurality of knowledge sources.

4. The system as claimed in claim 1, wherein stress action words are atomic so that the addition of new stress action words does not require changes to previous existing stress action words.

5. The system as claimed in claim 1, wherein stress action words maintain their own lock and state requirements.

6. The system as claimed in claim 1, wherein each stress action word begins with the word "cycle" in which each action word performs the function of cycling through a chosen stress test operation.

7. The system as claimed in claim 1, wherein the hierarchical lock file is an equipment lock tree which maintains lock and state data for storage network area components which require arbitration for stress tests.

8. The system as claimed in claim 1, wherein the controller is a lock manager which synchronizes all reads and writes to the hierarchical lock file from parallel stress action words.

9. A method for synchronizing and coordinating parallel, automated fault injection processes against storage area network arrays, comprising:
   creating a hierarchical lock file which is a repository for lock and state data of storage area network resources;
   generating a plurality of stress action words which are utilized by the hierarchical lock file to coordinate multiple, parallel stress tests against storage area network components without requiring modifications to the underlying code; and
   communicatively coupling the plurality of stress action words to the hierarchical lock file via a controller for monitoring activities of the storage area network resources and injecting faults.

10. The system as claimed in claim 9, wherein the hierarchical lock file includes a lock queue allowing multiple, parallel action words to arbitrate for a resource.

11. The system as claimed in claim 9, wherein the hierarchical lock file includes data access methods to decouple the controller and plurality of knowledge sources.

12. The system as claimed in claim 9, wherein stress action words are atomic so that the addition of new stress action words does not require changes to previous existing stress action words.

13. The system as claimed in claim 9, wherein stress action words maintain their own lock and state requirements.

14. The system as claimed in claim 9, wherein each stress action word begins with the word "cycle" in which each action word performs the function of cycling through a chosen stress test operation.

15. The system as claimed in claim 9, wherein the hierarchical lock file is an equipment lock tree which maintains lock and state data for storage network area components which require arbitration for stress tests.

16. The system as claimed in claim 9, wherein the controller is a lock manager which synchronizes all reads and writes to the hierarchical lock file from parallel stress action words.

17. A computer-readable medium having computer-executable instructions for performing a method for synchronizing and coordinating parallel, automated fault injection processes against storage area network arrays, the method comprising:
   creating a hierarchical lock file which is a repository for lock and state data of storage area network resources;
   generating a plurality of stress action words which are utilized by the hierarchical lock file to coordinate multiple, parallel stress tests against storage area network components without requiring modifications to the underlying code; and
   communicatively coupling the plurality of stress action words to the hierarchical lock file via a controller for monitoring activities of the storage area network resources and injecting faults.

18. The computer-readable medium as claimed in claim 17, wherein the hierarchical lock file includes a lock queue allowing multiple, parallel action words to arbitrate for a resource.

19. The computer-readable medium as claimed in claim 17, wherein stress action words are atomic so that the addition of new stress action words does not require changes to previous existing stress action words.

20. The computer-readable medium as claimed in claim 17, wherein stress action words maintain their own lock and state requirements.

* * * * *